United States Patent

Bain

[15] 3,639,677
[45] Feb. 1, 1972

[54] ELECTRICAL CONDUIT COUPLING MEANS

[72] Inventor: Andrew Bain, 2440 Greenwich, San Francisco, Calif. 94123

[22] Filed: Sept. 24, 1970

[21] Appl. No.: 75,107

[52] U.S. Cl. .............................. 174/84 S, 174/65 R, 174/78, 285/80, 285/158, 285/398
[51] Int. Cl. ...................................................... H02g 15/08
[58] Field of Search .................. 174/84 R, 84 S, 65 R, 88 R, 174/88 C, 88 S, 91, 51, 78; 285/80, 149, 158, 161, 251, 256, 398

[56] References Cited

UNITED STATES PATENTS 1,831,856   11/1931   Fullman .......................... 285/161 X
2,475,322   7/1949   Horton et al. .......................... 285/161
2,518,426   8/1950   Kinander .......................... 174/65 UX Primary Examiner—Darrell L. Clay
Attorney—Mellin, Moore & Weissenberger

[57] ABSTRACT

Coupling means for coupling a spirally wound flexible conduit to an electrical conduit or conduit box including a double-walled housing having projections thereon adapted to mate with the spirally wound surfaces of the flexible conduit and locking means for both further securing the flexible conduit within the walls of the housing and forming an electrical ground between the double-walled housing and the flexible conduit via the locking means.

12 Claims, 4 Drawing Figures

PATENTED FEB 1 1972
3,639,677
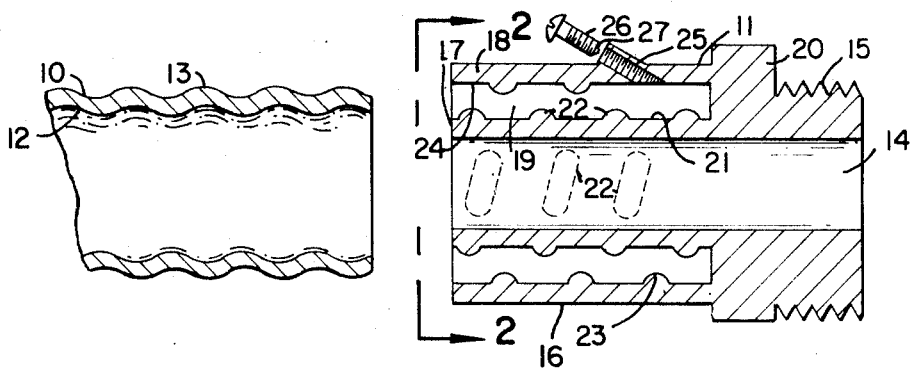
FIG_1
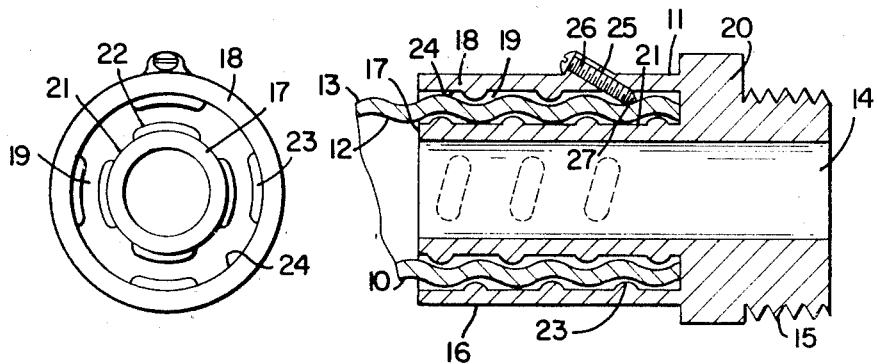
FIG_2  FIG_3
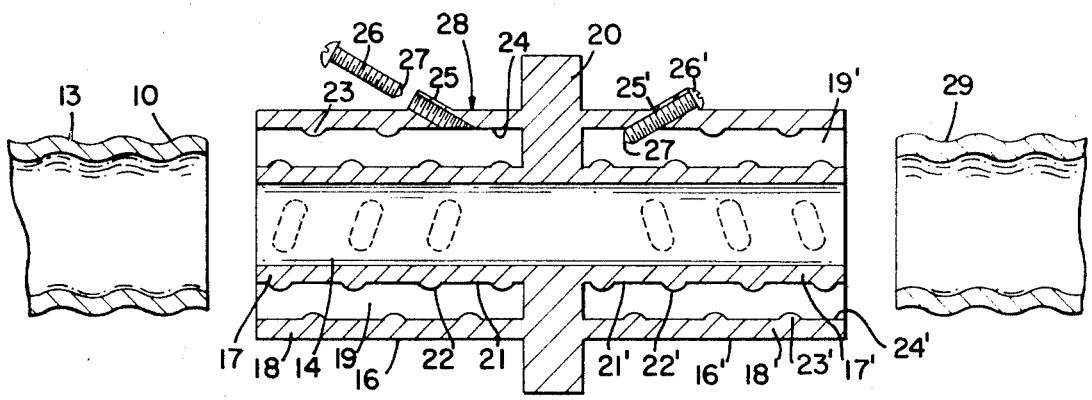
FIG_4
INVENTOR.
ANDREW BAIN
BY
Mellin, Moore & Weissenberger
ATTORNEYS

ELECTRICAL CONDUIT COUPLING MEANS

BACKGROUND OF THE INVENTION

1. Field of the Invention

The invention relates to electrical conduit couplings; and more particularly to couplings for securing flexible conduits to other electrical conduits, such as a second flexible connector or an electrical outlet box.

2. Description of the Prior Art

It is often desirable to connect flexible conduits carrying electrical wiring therein to a like conduit or to an electrical outlet box. When using such flexible conduits, which are generally of metal or similar electrically conductive material and are spirally wound so that a spiral surface is formed on both the inner and outer walls of such conduits, it is usually necessary to run a separate ground wire in the conduit. Couplings or connectors are then threaded into the metal flexible conduit forming a ground. This connector or coupling is then joined to a like flexible conduit or to an electrical outlet box.

However, there have been instances where the flexible conduit or circuits, due to vibration, has become loose from connection with the coupling or connector resulting in electric shock or even electrocution to those coming into contact therewith. Further, known couplers or connectors may distort such flexible conduits in attempting to secure the conduit therein and are generally fairly complex in the number of parts and arrangement thereof for carrying out the foregoing.

SUMMARY OF THE INVENTION

It is an object of this invention to provide means for connecting flexible conduits to an electrical conduit or the like in a secure manner without distorting such flexible conduits.

It is a further object of this invention to join such a unique manner whereby an electrical ground is always maintained between the conduits.

It is still further object to carry out the foregoing using relatively few parts.

These and other parts are preferably accomplished by providing a connector or coupling including a double-walled housing having projections thereon adapted to mate with the spirally wound surfaces of the flexible conduit and locking means for both further securing the flexible conduit within the walls of the housing and forming an electrical ground between the double-walled housing and the flexible conduit via the locking means.

BRIEF DESCRIPTION OF THE DRAWINGS

FIG. 1 is a vertically sectional exploded view of a first embodiment of my invention prior to connection thereof;

FIG. 2 is a view taken along lines II—II of FIG. 1;

FIG. 3 is a view similar to FIG. 1 showing the elements assembled in accordance with the teachings of my invention; and FIG. 4 is a vertical sectional exploded view of a second embodiment of my invention prior to connection thereof.

DESCRIPTION OF THE PREFERRED EMBODIMENTS

Referring now to FIG. 1 of the drawing, a flexible conduit 10 is shown adapted to be inserted into a connector or coupling 11. As can be seen, conduit 10 is a conventional elongated hollow flexible conduit, well known in the electrical art, which is generally made of a metallic electrically conductive material and formed for a spirally wound strip of such material. This type of cable is commonly referred to as a "BX Cable" and the spiral winding of such a cable results in a cable having inner and outer helically convoluted surfaces. In this manner, electrical wires are carried by the conduit also as is well known in the art. The spirally wound feature of conduit 10 thus results in the conduit 10 having both spirally wound inner and outer helically convoluted surfaces 12 and 13, respectively, as clearly illustrated in FIG. 1.

Coupling 11, which is also of metal or a similar electrically conductive material, includes a central longitudinally extending aperture 14 for passing the wires (not shown) carried by conduit 10 therethrough. The generally cylindrically shaped body of coupling 11 includes a threaded portion 15 at one end and a double-walled portion 16 (forming spaced inner wall 17 and outer wall 18 with channel 19 formed therebetween) at the other end, an enlarged abutment member 20 separating portions 15 and 16.

Threaded portion 15 comprises connecting means for connecting the coupling 10 to a suitable electrical conduit or conduit box. The outer periphery 21 of inner wall 17 includes a plurality of projections or lobes 22 or the like, these lobes 22 (see also FIG. 2) being spaced along periphery 21 of wall 17 and angled (see the dotted lines in FIG. 1) so as to conform in both thickness and angularity to the spirally wound inner surface 12 of conduit 10.

In like manner, a plurality of similar projections or lobes 23 (see also FIG. 2) are disposed about the inner periphery 24 of outer wall 18. The width of channel 19 is generally related to the thickness of the spirally wound conduit 10 so that the inner and outer surfaces 12 and 13 of conduit 10 simultaneously engage lobes 22 and 23, respectively, when conduit 10 is inserted into channel 19, as by threading or screwing it therein, in the manner illustrated in FIG. 3.

Referring back to FIG. 1, a threaded aperture 25 extends through outer wall 18 for receiving a threaded screw 26 therein, the length of screw 26 being such that end 27 thereof is adapted to "bite" into metal conduit 10 and thus form a ground between conduit 10 and wall 18 (and thus coupling 11) as can be seen in the assembled view of FIG. 3. Aperture 25 is preferably at an angle to the longitudinal axis of wall 18, as for example, at an angle of approximately 45° thereto oriented in the direction as shown in FIG. 1.

In this manner, the lobes 22 and 23 on coupling 11 serve as a "screw" for receiving the spirally wound flexible conduit 10. This screw action not only serves to hold the conduit 10 firmly within coupling 11, but accomplishes this without appreciable distortion of conduit 10 whereby known prior art couplings secure the conduit therein merely by means of a setscrew or the like applying pressure to only the outer periphery of such conduits. Thus, in my disclosed invention, vibration of either the conduit or the coupling or both will not loosen the connection therebetween and a novel simple positive connection has been disclosed.

Further, the coupling of my invention is accomplished in a manner whereby the wiring system is always positively and firmly grounded, as by the setscrew 26 biting into the conduit 10. Such biting action also serves as an additional holding or locking means for the conduit 10 so that it cannot break loose from coupling 11 under any circumstances.

As discussed hereinabove the connecting means for coupling 11 has been described in FIGS. 1 through 3 with reference to a threaded portion 15 on coupling 11 which is adapted to be threaded into a mating threaded aperture of a suitable electrical conduit box. Such suitable electrical conduit may be a flexible conduit similar to conduit 10. In the latter case, connecting means on coupling 11 may be modified in the manner described hereinbelow with respect to FIG. 4 wherein like numerals refer to like parts of FIGS. 1 through 3.

Thus, as shown, coupling 28, in place of threaded portion 15, includes a double-walled portion 16' similar to portion 16. Since double-walled portion 16' and its various features are identical to that of FIGS. 1 through 3, and merely a mirror image thereof, further description thereof would appear to be unnecessary, the primed numerals referring to like numerals of portion 16. A second spirally wound flexible conduit 29 may then be inserted into channel 19' and secured therein in the manner discussed hereinabove with respect to FIG. 3. Setscrew 26' may then be screwed into aperture 25' and end 27' bites into conduit 29 also as described hereinabove.

In this manner a pair of flexible conduits 10 and 29 may be spliced together in a quick, secure, permanent manner with the wiring system always grounded. In both embodiments, such fastening and grounding means is carried out with a minimum of parts and both couplings 11 and 28 may be manufactured simply and economically. For example, lobes 22 and 23 (and 22' and 23') may be molded on their appropriate walls during the manufacture thereof or added thereto after manufacturing by any suitable means.

I claim as my invention:

1. A coupling for an elongated hollow flexible conduit or the like, said conduit being spirally wound in a manner resulting in helically convoluted spirally wound inner and outer surfaces, said coupling comprising:
  a generally cylindrical elongated housing having a double-walled portion having a pair of spaced inner and outer cylindrical walls, the spacing between said walls forming a channel between said walls for receiving one end of said conduit therein;
  first projection means disposed about the outer periphery of said inner wall for engaging said inner spirally wound surface of said conduit;
  second projection means disposed about the inner periphery of said outer wall for engaging said outer spirally wound surface of said conduit;
  locking means extending through the outer wall of said double-walled portion and adapted to engage said conduit for holding said conduit firmly within said channel, said locking means being adapted to simultaneously penetrate into said conduit a distance sufficient to form an electrical ground between said outer wall and said conduit via said locking means; and
  connecting means carried by said housing for connecting said housing to a second electrical conduit which is also spirally wound in a manner resulting in helically convoluted spirally wound inner and outer surfaces.

2. The coupling of claim 1 wherein said locking means includes a threaded aperture formed in said outer wall and opening into said channel and a locking screw adapted to be threaded in said aperture for biting engagement with said first-mentioned conduit.

3. The coupling of claim 2 wherein said aperture is disposed at an angle of approximately 45° with respect to the longitudinal axes of said outer wall.

4. The coupling of claim 1 wherein said connecting means includes a second double-walled portion having a pair of spaced inner and outer cylindrical walls, the spacing between said walls forming a second channel between the walls of said second double-walled portion for receiving one end of said second conduit;
  the inner wall of said second double-walled portion having third projection means disposed about its outer periphery for engaging the inner spirally wound surface of said second conduit;
  the outer wall of said second double-walled portion having fourth projection means disposed about its inner periphery for engaging the outer spirally wound surface of said second conduit; and
  second locking means extending through the outer wall of said second double-walled portion and adapted to engage said second conduit for holding said second conduit firmly within the channel formed between the walls of said second double-walled portion, said second locking means being adapted to simultaneously penetrate into said second conduit a distance sufficient to form an electrical ground between the outer wall of said second double-walled portion and said second conduit via said second locking means.

5. The coupling of claim 4 wherein said second locking means includes a threaded aperture formed in the outer wall of said second double-walled portion and opening into the channel formed between the walls of said second double-walled portion and a locking screw threaded into said last-mentioned aperture.

6. Apparatus for coupling a first elongated hollow flexible electrical conduit to a second elongated hollow flexible electrical conduit wherein said conduits are spirally wound in a manner resulting in helically convoluted inner and outer surfaces, said apparatus comprising:
  a generally cylindrical elongated housing having a double-walled portion having a pair of spaced inner and outer cylindrical walls, the space between said walls forming a channel between said walls for receiving one end of said first conduit therein;
  first projection means disposed about the outer periphery of said inner wall for engaging said inner spirally wound surface of said first conduit;
  second projection means disposed about the inner periphery of said outer wall for engaging said outer spirally wound surface of said first conduit;
  locking means extending through the outer wall of said double-walled portion and adapted to engage said second conduit, thereby holding said first conduit firmly within said channel, said locking means adapted to penetrate into said first conduit a distance sufficient to form an electrical ground between said outer wall and said first conduit via said locking means;
  connecting means carried by said housing for connecting said housing to said second electrical conduit.

7. The apparatus of claim 6 wherein said locking means includes a threaded aperture formed in said outer wall and opening into said channel and a locking screw threaded in said aperture for biting engagement with said first conduit.

8. The coupling of claim 6 wherein said connecting means includes a second double-walled portion having a pair of spaced inner and outer cylindrical walls, the spacing between said walls forming a second channel between the walls of said second double-walled portion for receiving one end of said second conduit therein;
  the inner wall of said second double-walled portion having third projection means disposed about its outer periphery for engaging the inner surface of said second conduit;
  the outer wall of said second double-walled portion having fourth projection means disposed about its inner periphery for engaging the outer surface of said second conduit; and
  second locking means extending through the outer wall of said second double-walled portion adapted to engage said second conduit for holding said second conduit firmly within the channel formed between the walls of said second double-walled portion, said second locking means adapted to penetrate into said second conduit a distance sufficient to form an electrical ground between the outer wall of said second double-walled portion and said second conduit via said second locking means.

9. A coupling for an elongated hollow flexible conduit, said conduit being spirally wound in a manner resulting in helically convoluted innner and outer surfaces, said coupling comprising:
  a generally cylindrical elongated housing having a double-walled portion having a pair of spaced inner and outer cylindrical walls, the spacing between said walls forming a channel between said walls for receiving one end of said conduit therein;
  first projection means disposed about the outer periphery of said inner wall for engaging said inner spirally wound surface of said conduit;
  second projection means disposed about the inner periphery of said outer wall for engaging said outer spirally wound surface of said conduit;
  locking means extending through the outer wall of said double-walled portion adapted to extend into engagement with said conduit for holding said conduit firmly within said channel, said locking means being adapted to simultaneously penetrate into said conduit a distance sufficient to form an electrical ground between said outer wall and said conduit via said locking means; and connecting means carried by said housing for connecting said housing to an electrical conduit box.

10. The coupling of claim 9 wherein said housing includes a substantially solid portion at one end and said double-walled portion at the other end; and said connecting means includes threaded means thereon adapted to be threaded into a mating threaded portion of said electrical conduit box.

11. Apparatus for coupling an elongated hollow flexible conduit to an electrical conduit box wherein flexible conduit is spirally wound in a manner resulting in helically convoluted inner and outer surfaces, said apparatus comprising:

a generally cylindrical elongated housing having a double-walled portion having a pair of spaced inner and outer cylindrical walls, the spacing between said walls forming a channel between said walls for receiving one end of said conduit therein;

first projection means disposed about the outer periphery of said inner wall for engaging said inner spirally wound surface of said conduit;

second projection means disposed about the inner periphery of said outer wall for engaging said outer spirally wound surface of said conduit;

locking means extending through the outer wall of said double-walled portion adapted to engage said conduit for holding said conduit firmly within said channel, said locking means adapted to penetrate into said conduit a distance sufficient to form an electrical ground between said outer wall and said conduit via said locking means; and connecting means carried by said housing for connecting said housing to said electrical conduit box.

12. The coupling of claim 11 wherein said housing includes a substantially solid portion at one end and said double-walled portion at the other end; and said connecting means includes threaded means adapted to be threaded into a mating threaded portion of said electrical outlet box.

* * * * *